United States Patent
Tanigawa et al.

(10) Patent No.: US 7,564,217 B2
(45) Date of Patent: Jul. 21, 2009

(54) BATTERY PACK MANAGER AND METHOD OF DETECTING A LINE CUT

(75) Inventors: Keisuke Tanigawa, Nishio (JP); Tetsuya Kobayashi, Anjo (JP)

(73) Assignee: Denso Corporation, Kariya (JP)

( * ) Notice: Subject to any disclaimer, the term of this patent is extended or adjusted under 35 U.S.C. 154(b) by 392 days.

(21) Appl. No.: 11/271,741

(22) Filed: Nov. 14, 2005

(65) Prior Publication Data

US 2006/0103351 A1    May 18, 2006

(30) Foreign Application Priority Data

Nov. 18, 2004    (JP)    ............................. 2004-335002

(51) Int. Cl.
*H02J 7/00*    (2006.01)
(52) U.S. Cl. ..................... 320/118; 320/119; 324/434
(58) Field of Classification Search ................ 320/103, 320/104, 116, 117, 118, 119, 120, 121, 135, 320/136; 324/433, 434; 307/10.1, 10.7; 903/906, 907
See application file for complete search history.

(56) References Cited

U.S. PATENT DOCUMENTS

| | | | | |
|---|---|---|---|---|
| 4,331,911 A | * | 5/1982 | Park | 320/119 |
| 5,504,415 A | * | 4/1996 | Podrazhansky et al. | 320/118 |
| 5,528,122 A | * | 6/1996 | Sullivan et al. | 320/118 |
| 5,557,189 A | * | 9/1996 | Suzuki et al. | 320/119 |
| 5,659,237 A | * | 8/1997 | Divan et al. | 320/119 |
| 5,869,950 A | * | 2/1999 | Hoffman et al. | 320/103 |
| 5,903,137 A | * | 5/1999 | Freiman et al. | 320/163 |
| 6,150,795 A | * | 11/2000 | Kutkut et al. | 320/118 |
| 6,225,780 B1 | * | 5/2001 | Koch | 320/118 |
| 6,313,637 B1 | * | 11/2001 | Iino et al. | 324/434 |
| 6,316,915 B1 | * | 11/2001 | Fujiwara et al. | 320/134 |

(Continued)

FOREIGN PATENT DOCUMENTS

JP    A-11-150877    6/1999

(Continued)

OTHER PUBLICATIONS

Notification of Reasons for Rejection for Japanese Patent Application No. 2004-335002; Japanese Patent Office, Dec. 14, 2007.

*Primary Examiner*—Akm E Ullah
*Assistant Examiner*—M'Baye Diao
(74) *Attorney, Agent, or Firm*—Oliff & Berridge, PLC (57) ABSTRACT

In a battery pack manager that manages series-connected rechargeable unit cells, a cell equalizer equalizes the cell voltages by individually discharging the unit cells according to deviations from reference voltages. An overcharge/overdischarge detector detects an overcharge and an overdischarge state of each unit cell. An inhibit circuit prevents the cell equalizer from discharging the unit cells when the overcharge/overdischarge detector is activated to reduce the cell voltage variability, which would otherwise occur as a result of interference from the overcharge/overdischarge detector, so that the overcharge/overdischarge states of all unit cells can be determined with precision. Connecting lines of the unit cells are monitored to detect a line-cut. The inhibit circuit further inhibits the cell equalizer when the connecting lines are being monitored to reduce the cell voltage variability, which would otherwise occur as a result of interference from the line-cut detection, so that false line-cut detection is avoided.

13 Claims, 11 Drawing Sheets

U.S. PATENT DOCUMENTS

| | | | |
|---|---|---|---|
| 6,747,438 B2 * | 6/2004 | Emori et al. | 320/126 |
| 6,765,312 B1 * | 7/2004 | Urlass et al. | 307/10.1 |
| 6,909,201 B2 * | 6/2005 | Murty et al. | 307/10.1 |
| 6,977,483 B2 | 12/2005 | Iwashima | |
| 2002/0113595 A1 * | 8/2002 | Sakai et al. | 324/433 |
| 2003/0094928 A1 * | 5/2003 | Emori et al. | 320/162 |
| 2004/0135546 A1 * | 7/2004 | Chertok et al. | 320/118 |

FOREIGN PATENT DOCUMENTS

| | | |
|---|---|---|
| JP | A 2001-174531 | 6/2001 |
| JP | A-2002-325370 | 11/2002 |
| JP | A-2003-084015 | 3/2003 |
| JP | A 2004-104989 | 4/2004 |

* cited by examiner

BATTERY PACK MANAGER AND METHOD OF DETECTING A LINE CUT

CROSS-REFERENCE TO RELATED APPLICATION

This application is based on Japanese Patent Application No. 2004-335002, filed Nov. 18, 2004, which is incorporated herein by reference.

BACKGROUND OF THE INVENTION

1. Field of the Invention

The present invention relates to battery pack controllers, and more specifically to a battery pack controller that performs control on the voltages and charge/discharge states of unit cells and cell-modules of a battery pack mounted on a motor vehicle.

2. Description of the Related Art

In motor vehicles such as electric cars and hybrid cars, it is the usual practice to assemble a large number of lithium unit cells into a single package, known as battery pack, and bundle their power-feed lines to reduce their wiring cross-section and the loss of their associated switching elements. Since lithium cells are susceptible to over-charging and over-discharging, the voltages developed by the unit cells tend to vary significantly from one cell to another. To eliminate the voltage variability, a cell equalizer is used as an indispensable element to prevent the unit cells from becoming over-charged or over-discharged. One example of such cell equalizer is shown and described in Japanese Patent Publication 2002-325370. Since the number of unit cells in a battery pack is as large as several hundred, they are equally divided into a number of groups, called "modules", and a plurality of inter-cell cell equalizers are provided, one for each module to equalize the inter-cell voltages of each module. An inter-module cell equalizer may also be used to eliminate a voltage difference that can possibly occur between the modules.

Another indispensable tool for the management of a battery pack involves the use of an overcharge/overdischarge detector that monitors the charge/discharge state of each unit cell and cuts off its charge/discharge currents or provides a preventive measure by controlling the cell currents based on the monitored state. In a hybrid car where a high-voltage battery pack is used, the number of unit cells is significantly large and the voltage difference between the unit cells is high. Because of this reason, the unit cells of the high-voltage battery pack are equally segmented into multiple modules in like manner to the cell equalizer and each module is controlled by a module controller. In addition to the segmentation, the overcharge/overdischarge detector is provided to supply its output to a battery pack controller that provides an overall management of the battery pack in order to achieve simplification of its wiring and isolation of its input and output lines.

Also known is a line monitor that monitors the lines connecting the opposite terminals of each module and the opposite terminals of each unit cell to the module controllers for detecting a possible disconnection, as shown and described in Japanese Patent Publications 2002-325370 and 2003-084015.

However, when the module controllers provide control on the cell equalizer and the overcharge/overdischarge detector in an attempt to reduce cell-to-cell voltage differences while preventing each cell of a module from being overcharged or overdischarged, the operation of the overcharge/overdischarge detector conflicts with the operation of the cell equalizer, causing the voltage of each unit cell of the module to vary significantly. As a result, the charge/discharge state of each unit cell cannot precisely detected. In particular, when the cell equalizer is operating a unit cell in a discharge mode and a disconnection should occur in the line connecting this unit cell to the discharge resister of the cell equalizer, a unit-cell voltage will be impressed in error on a cell charge/discharge monitor that is associated with a unit cell adjacent to the discharge-mode unit cell, resulting in a significant error on the determination of overcharge/overdischarge state of the unit cell.

Furthermore, if line-cut detection is performed when the cell equalizer is operating to equalize cell voltages, the current that flows through the discharge resistor of the equalizer interferes with the line-cut detection and a false line-cut decision could result.

SUMMARY OF THE INVENTION

It is therefore an object of the present invention to provide a battery pack manager capable of performing overcharge/overdischarge detection, a line-cut detection and cell-equalization without causing mutual interference and without introducing complexity and increasing power dissipation.

According to a first aspect of the present invention, there is provided a battery pack manager for a plurality of unit cells of secondary battery connected in series, comprising a cell equalizer, associated with the unit cells, that equalizes cell voltages developed by the unit cells, an overcharge/overdischarge detector, associated with the unit cells, that operates to detect an overcharge and an overdischarge of the unit cells, and an inhibit circuit that prevents the cell equalizer from discharging the unit cells when the overcharge/overdischarge detector is operating. Since cell voltage variability which would otherwise occur as a result of interference from overcharge/overdischarge detection is reduced by the inhibit circuit, overcharge/overdischarge states of the unit cells can be determined with precision.

According to a second aspect of the present invention, there is provided a battery pack manager for a plurality of unit cells of secondary battery connected in series, comprising a cell equalizer, associated with the unit cells, that equalizes cell voltages developed by the unit cells, a line monitor, associated with the unit cells, that monitors connecting lines that connect the unit cells to the cell equalizer, an overcharge/overdischarge detector, associated with the unit cells, that detects an overcharge and an overdischarge of the unit cells, and an inhibit circuit that prevents the cell equalizer from discharging the unit cells when the line monitor is monitoring the connecting lines. Since cell voltage variability which would otherwise occur as a result of interference from line-cut detection is reduced by the inhibit circuit, detection of false line-cut can be avoided.

In a preferred embodiment, the cell equalizer is activated to perform cell voltage equalization when a main switch of the battery pack is turned off. This allows the cell equalizer to use open-circuit cell voltages as reference voltages, false detection of overcharge/overdischarge states of the unit cells and false detection of line-cut on the connecting lines can be easily avoided using a simple circuit.

In a further preferred embodiment, the overcharge/overdischarge circuit is inhibited when the cell equalizer is activated. This allows the cell equalizer to be inhibited with a simple circuit when overcharge/overdischarge detection or line-cut detection is performed.

According to a third aspect of the present invention, there is provided a battery pack manager for a plurality of unit cells of secondary battery connected in series, comprising a cell equalizer, connected to the unit cells via a plurality of connecting lines, that equalizes cell voltages developed by the unit cells, an overcharge/overdischarge detector, connected to the unit cells via the plurality of connecting lines, that makes a decision on whether the unit cells are overcharged or overdischarged, a line-cut detector that detects a line-cut on the connecting lines, and an inhibit circuit that inhibits decision output of the overcharge/overdischarge detector when a line-cut is detected by the line-cut detector on one of the connecting lines. Since the output signal of the overcharge/overdischarge detector that arises at the instant a line-cut is detected is not used, false battery-pack management can be avoided.

According to a fourth aspect of the present invention, there is provided a battery pack manager for a plurality of unit cells of secondary battery connected in series, comprising a cell equalizer, connected to the unit cells via a plurality of connecting lines, that equalizes cell voltages developed by the unit cells, an overcharge/overdischarge detector, connected to the unit cells via the connecting lines, that makes a decision on whether the unit cells are overcharged or overdischarged, a line-cut detector that detects a line-cut on the connecting lines, and an inhibit circuit that inhibits discharge operation of the cell equalizer when a line-cut is detected by the line-cut detector on one of the connecting lines. Since the cell equalizer is inhibited immediately following the detection of a line-cut, cell equalization, which would otherwise be performed using differing cell voltages caused by the line-cut, is inhibited and hence useless discharging of the unit cells can be avoided. In addition, since the line voltage on the line where the line-cut is detected tends to vary significantly due to cell equalization on that failed line and useless cell equalization ensues, the present invention prevents the unit cells from being discharged by such useless cell equalization.

According to a fifth aspect, the present invention provides a battery pack manager for a plurality of rechargeable unit cells connected in series, wherein the unit cells are divided into a plurality of battery-pack modules. The battery-pack manager comprises a battery-pack controller, connected to the battery-pack modules via a pair of battery-pack connecting lines and a plurality of module-connecting lines, for successively detecting a voltage value of each of the battery-pack modules. The controller then determines that a line-cut has occurred on one of the battery-pack connecting lines if a single zero-voltage value is detected and determines that a line-cut has occurred on one of the module-connecting lines if two zero-voltage values are detected in succession.

According to a further aspect, the present invention provides a method of detecting a line-cut on a plurality of connecting lines connecting a plurality of series-connected rechargeable unit cells to control circuitry, wherein the unit cells are divided into a plurality of battery-pack modules, comprising the steps of (a) successively detecting a voltage value of each of the battery-pack modules, and (b) determining that a line-cut has occurred on one of the battery-pack connecting lines if a single zero-voltage value is detected or that a line-cut has occurred on one of the module-connecting lines if two zero-voltage values are detected in succession.

BRIEF DESCRIPTION OF THE DRAWINGS

The present invention will be described in detail with reference to the following drawings, in which.

DETAILED DESCRIPTION

Battery Pack 1

Figure 1:
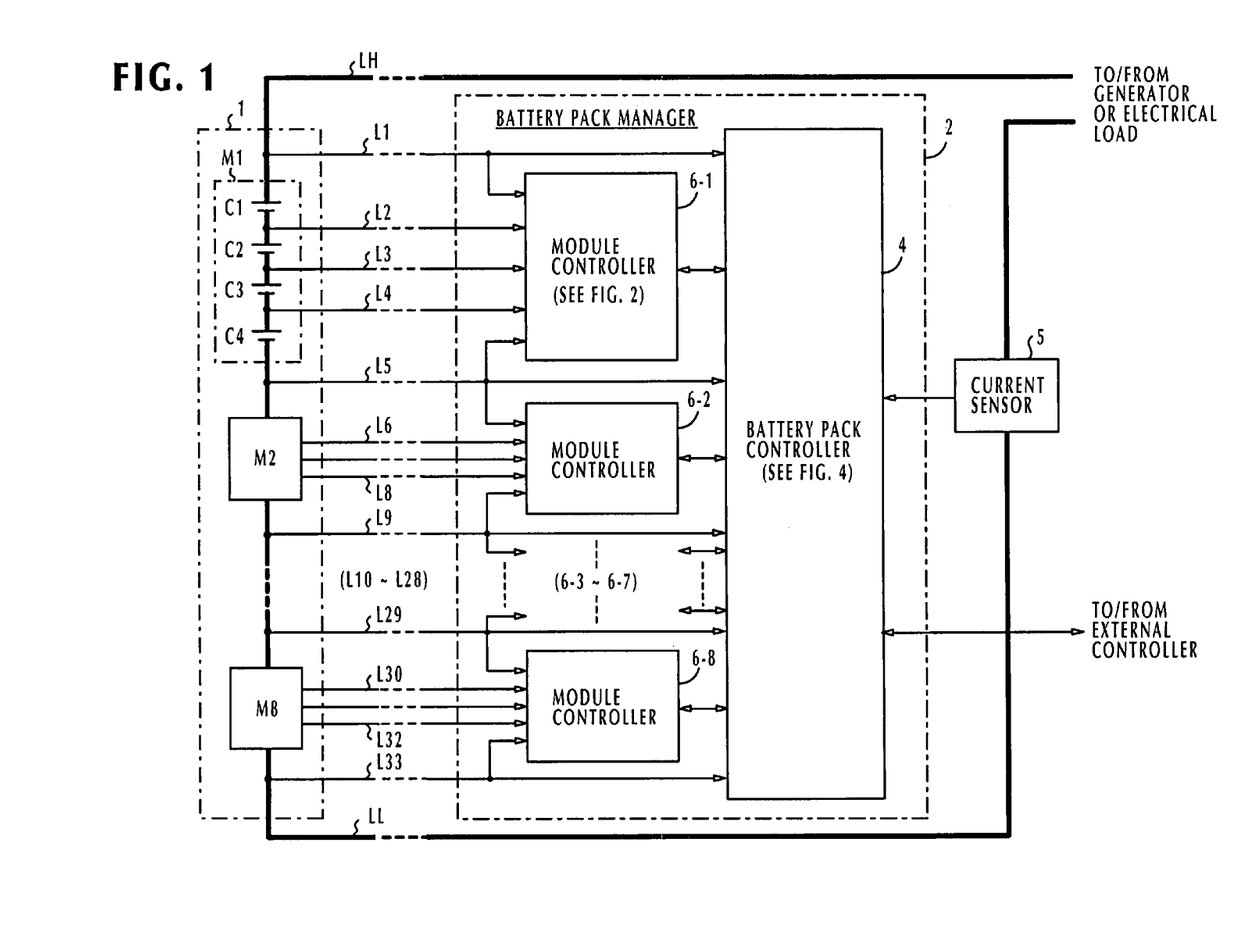
FIG. 1 is a block diagram of a battery pack manager of the present invention.

Referring to FIG. 1, a battery pack 1 and a battery pack manager 2 are illustrated. All unit cells of the battery pack 1 are lithium secondary cells whose voltages vary significantly from one cell to another. Because of the difficulty to individually control the cell voltages, the unit cells are segmented into multiple modules M1~M8. For the purpose of disclosure, each battery pack module is made up of four unit cells C1 through C4. All unit cells of the battery pack 1 are connected in series between a high-voltage power line LH and a low-voltage power line LL and these power lines are connected to a generator or an electrical load such as regenerative driving motor, not shown.

Battery Pack Manager 2

Battery pack manager 2 comprises a battery pack controller 4, a current sensor 5, and a plurality of module controllers 6-1 through 6-8 of identical configuration, respectively associated with the modules M1 through M8 to individually control their unit cells. Current sensor 5 monitors the low-voltage power line LL and informs the battery pack controller 4 of the amount of main current it detects from the power line LL. By integrating the detected main current, the battery pack controller 4 determines the state of charge (SOC) of the battery pack 1.

Battery Pack Controller 4

Battery pack controller 4 is connected to the modules M1~M8 through connecting lines L1, L5, L9, . . . , L29 and L33, to the module controllers 6-1~6-8 and further to an external controller, not shown, that controls the generator and electrical load. Battery pack controller 4 exchanges control information with the external controller to jointly provide an overall control on the battery pack 1 so that its operating state is maintained in an optimum range. If the capacity of the battery pack lowers, the battery pack controller 4 communicates this fact to the external controller to request it to recharge the battery pack 1. When the battery pack reaches its capacity the battery pack controller 4 requests the external controller to stop charging or discharge the battery pack.

For each of the modules M1~M8, the battery pack controller 4 includes a module discharge circuit 10 formed with a resistor Rm and a switch SWm connected in series between the module connecting lines, which are L1 and L5 in the case of module M1. CPU 11 is provided in the battery pack controller to control the module controllers M1~M8 in response to input signals therefrom as well as from the external controller and the current sensor 5.

CPU 11 is provided in the battery pack controller. As will be described later with reference to FIG. 4, the CPU 11 controls the switch SWm to discharge the module terminal voltage, and detects abnormal state of the voltages and temperatures of the battery pack 1 based on module terminal voltages from the battery pack 1, output signals from the module controllers 6 and current sensor 5 to perform one of a set of predetermined recovery actions on the unit cells of one or more modules by way of their associated module controllers 6.

Connecting Lines L1~L33

Connecting lines L1~L5 supply the terminal voltages of the unit cells C1~C4 of module M1 to the module controller 6-1. Similarly, the connecting lines L5~L9 supply the terminal voltages of the unit cells of module M2 to the module controller 6-2, and so on. Of all the connecting lines, the lines L1, L5, L9, L13, ..., L29 and L33 connect the opposite terminals of modules M1~M8, as clearly seen in FIG. 4, for detecting their terminal voltages. As will be described, the battery pack controller 4 is provided with a function that monitors these nine module-connecting lines L1, L5, ..., L33 for detecting a line-cut.

Module Controllers 6-1~6-8

Figure 2:
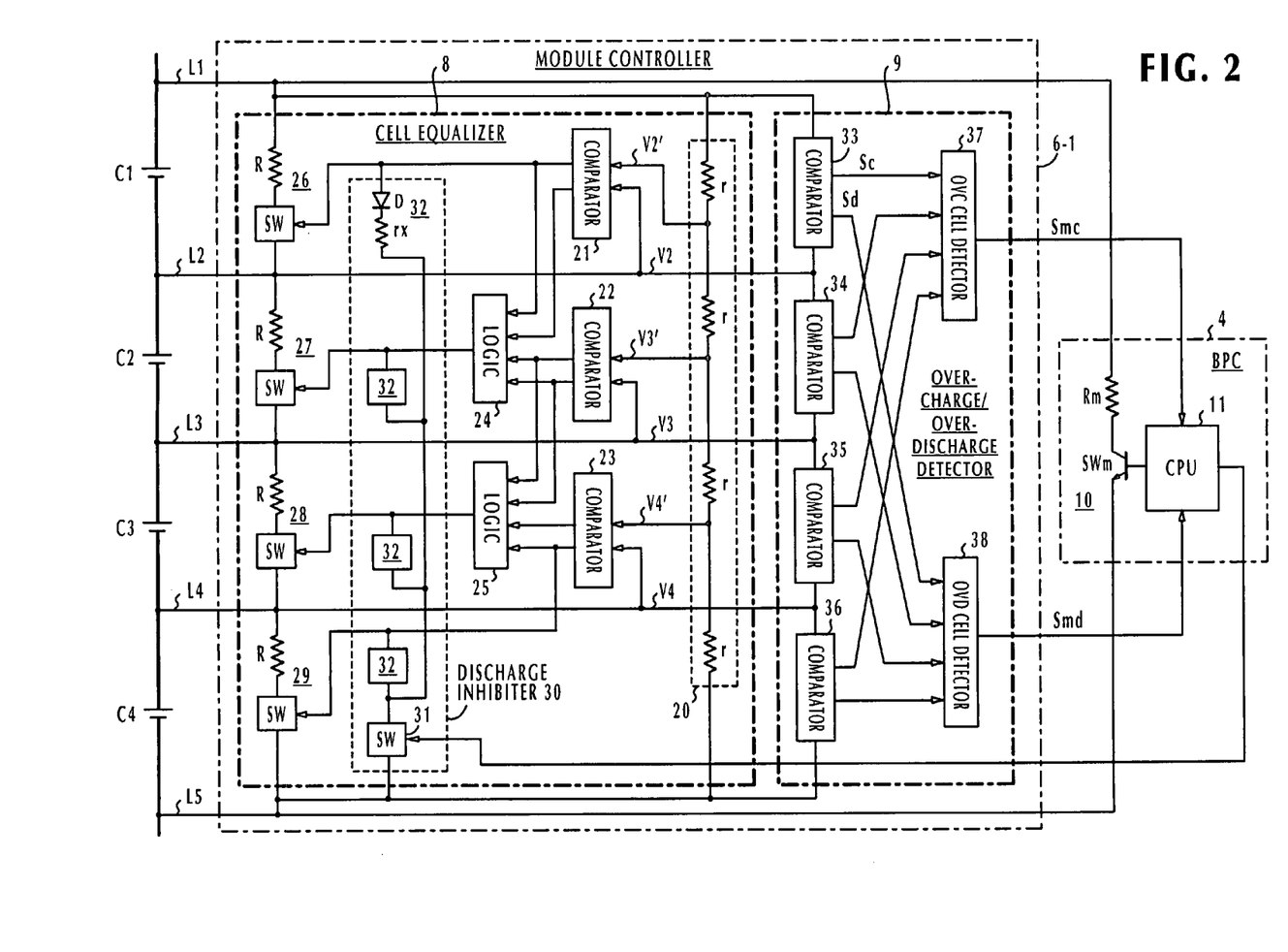
FIG. 2 is a block diagram of a module controller of the present invention.

Since the module controllers 6-1~6-8 are of identical configuration, it would be suffice to illustrate the detail of only one module controller, the module controller 6-1, for example, in FIG. 2. As illustrated, the module controller 6-1 generally comprises a cell equalizer 8 and an overcharge/overdischarge detector 9. Cell equalizer 8 and the overcharge/overdischarge detector 9 are connected to the terminals of unit cells C1~C4 through the connecting lines L1~L5.

Cell Equalizer 8

Cell equalizer 8 includes a voltage divider 20 formed with a plurality of resistors r of equal value connected in series between the connecting lines L1 and L5 to establish a plurality of reference voltages V2', V3' and V4'. A plurality of comparators 21, 22 and 23 are provided for making comparisons between line voltages V2, V3, V4 arranged in descending order from line L2 to line L4, and the reference voltages V2', V3' and V4' likewise arranged in descending order from line L2 to line L4.

In the cell equalizer 8, logic circuits 24 and 25 are connected to the comparators 21, 22 and 23 to determine which of the unit cells to be discharged based on comparison results supplied from the comparator output terminals. A plurality of discharge circuits 26~29 are respectively connected across the terminals of unit cells C1~C4 to selectively discharge the unit cells in response to the outputs of comparators 21 and 23 and the outputs of logic circuits 24 and 25. Each of the discharge circuits 26~29 consists of a resistor R and a switch connected in series across the terminals of the associated unit cell.

When the cell voltages of module M1 are equal to one another, line voltages V2, V3 and V4 are equal to the reference voltages V2', V3' and V4', respectively. Since the line voltages are measured with respect to the lowest-voltage line L5, if the cell voltage of cell C1 is higher than the ¼ of the module voltage across lines L1 and L5, the line voltage V2 is lower than the reference voltage V2', and if the cell voltage of cell C4 is higher than the ¼ of the module voltage, the line voltage V4 is higher than the reference voltage V4'. Therefore, the outputs of comparators 21 and 23 can be used to uniquely determine whether the unit cells C1 and C4 must be discharged or not, whereas the logic circuits 24 and 25 are required to determine whether or not the intermediate cells C2 and C3 are to be discharged.

Therefore, when the line voltage V2 is lower than the reference voltage V2', the comparator 21 produces an output that turns on the discharge circuit 26 to cause the unit cell C1 to discharge. When the line voltage V4 is higher than the reference voltage V4', the comparator 23 produces an output that turns on the discharge circuit 29 to cause the unit cell C4 to discharge. The comparison result of comparator 21 and its logical reverse are supplied to the logic circuit 24, and the comparison result of comparator 23 and its logical reverse are supplied to the logic circuit 25. The comparison result of comparator 22 and its logical reverse are supplied to both logic circuits 24 and 25.

Based on input logical values, the logic circuits 24 and 25 determine whether or not the unit cells C2 and C3 are to be discharged and supplies their decision results to the discharge circuits 27 and 28, respectively. More specifically, the logic circuit 24 produces an output that causes the unit cell C2 to discharge only when line voltage V3 is lower than reference voltage V3' and the unit cell C1 is not being discharged. Logic circuit 25 produces an output that causes the unit cell C3 to discharge only when line voltage V4 is higher than reference voltage V4' and the unit cell C4 is not being discharged. (For detailed description of the logic circuits 24 and 25, reference is made to the aforesaid Japanese Patent Publication 2002-325370).

In this way, the discharge circuits 26~29 are individually turned on to discharge their associated unit cells C1~C4 so that the inter-cell voltages V2~V4 approach the reference voltages V2'~V4'.

A discharge inhibiter 30 is provided in the cell equalizer 8. Discharge inhibiter 30 comprises a switch 31 and a plurality of low-impedance clamping circuits 32. Each clamping circuit 32 includes a diode D and a resistor rx connected in series to the switch 31. Switch 31 is preferably implemented with a photocoupler whose emitter electrode is connected to the connecting line L5 where the line voltage is the lowest of module M1 and whose collector electrode is connected through resistor rx to the cathode of diode D whose anode is connected to the control input of the associated discharge circuit. Diode D is thus backward biased to prevent the flow of reverse current to the control terminal of the associated discharge circuit. The photodiode of photocoupler 31 is responsive to a discharge inhibit signal supplied from the battery pack controller 4 by turning on its photo-transistor to forcibly set the switches of all discharge circuits 26~29 at the same time into OFF state.

Overcharge/Overdischarge Detector 9

Overcharge/overdischarge detector 9 comprises a plurality of comparators 33~36 of identical configuration, respectively connected across the opposite terminals of unit cells C1~C4 through connecting lines L1~L5. Each of the comparators 33~36 produces, at one of their output terminals, a cell overcharge signal Sc or a cell overdischarge signal Sd by comparing the cell voltage of the associated cell with low and high threshold voltages. The output terminals of each of comparators 33~36 are connected to an overcharged cell detector 37 and an overdischarged cell detector 38, respectively. Each of the detectors 37 and 38 is a logic circuit. Based on the logical values of its input terminals, the overcharged cell detector 37 determines whether there is at least one overcharged unit cell in the associated module and supplies the decision output to the CPU 11 of battery pack controller 4. Likewise, the overdischarged cell detector 38 determines from the logical levels of its input terminals whether there is at least one overdischarged unit cell in the associated module and supplies the decision output to the battery pack controller 4.

Figure 3:
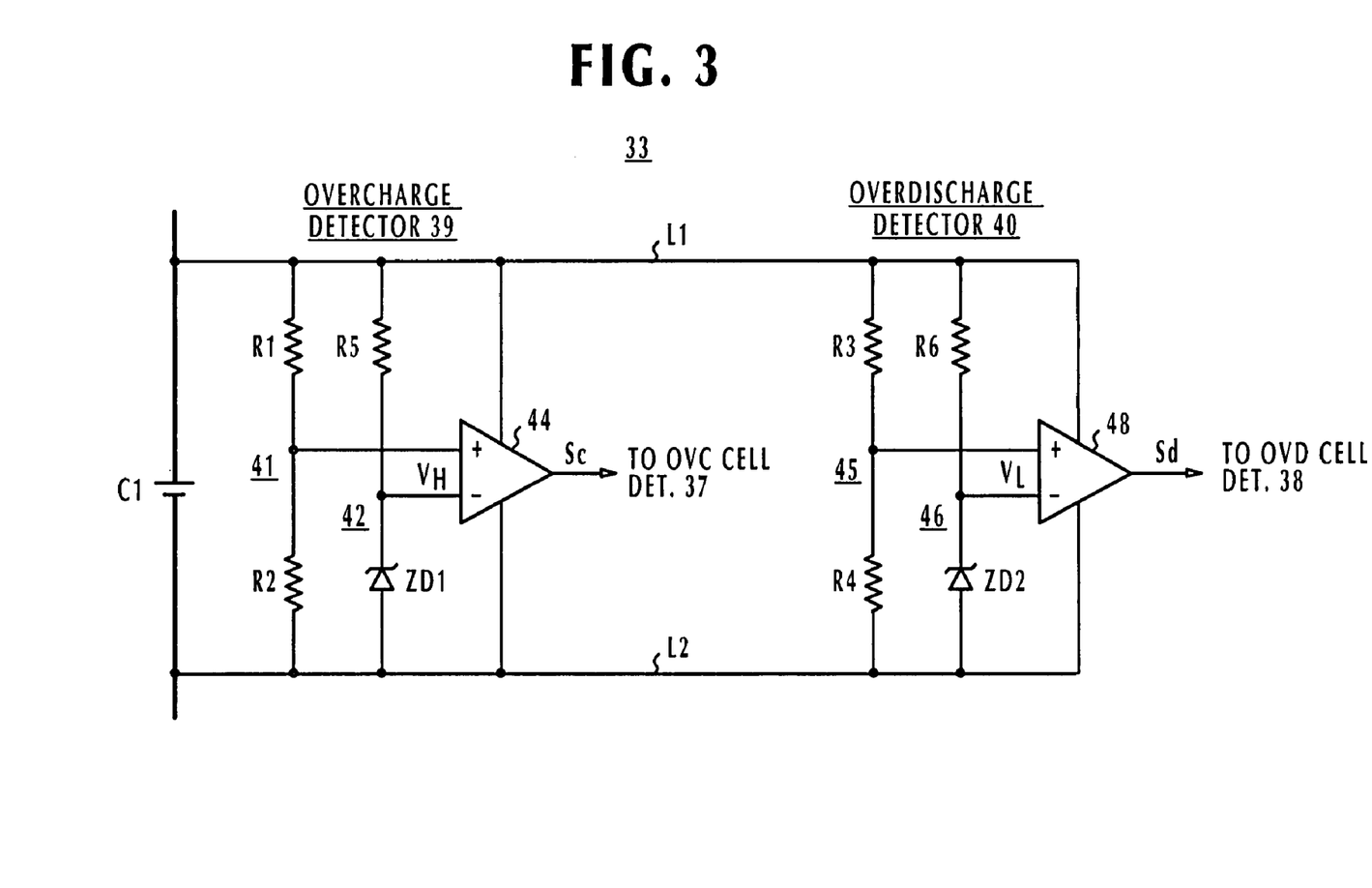
FIG. 3 is a circuit diagram of an overcharge/overdischarge detecting comparator of the module controller.

Since the comparators 33~36 are of identical configuration, only one comparator 33 is shown in detail in FIG. 3. Comparator 33 is comprised of an overcharge detector 39 and an overdischarge detector 40. In the overcharge detector 39, the cell voltage V1 is suitably scaled down by a voltage-divider 41 formed with resistors R1, R2 connected across the lines L1 and L2 and supplied to the noninverting input of a comparator 44. A high-threshold voltage $V_H$ is developed by a reference voltage source 42 formed with a resistor R5 and a Zener diode ZD1, connected across the lines L1 and L2, and supplied to the inverting input of the comparator 44. Comparator 44 compares the scaled-down voltage with the high threshold voltage $V_H$ and supplies a cell overcharge signal Sc to the overcharged cell detector 37 when the voltage V1 exceeds a predetermined level of charge.

Similarly, in the overdischarge detector 40, the cell voltage V1 is suitably scaled down by a voltage-divider 45 formed with resistors R3, R4 connected across the lines L1 and L2 and supplied to the noninverting input of a comparator 48. A low-threshold voltage $V_L$ is developed by a reference voltage source 46 formed with a resistor R6 and a Zener diode ZD2, connected across the lines L1 and L2, and supplied to the inverting input of the comparator 48. Comparator 48 compares the scaled-down voltage with the low threshold voltage $V_L$ and supplies a cell overdischarge signal Sd to the overdischarged cell detector 38 when the voltage V1 falls below a predetermined level of charge.

Overcharge Cell Detector 37 and Overdischarge Cell Detector 38

Overcharged cell detector 37 and overdischarged cell detector 38 have the effect of reducing the number of insulated wires the battery pack controller 4 needs to receive decision outputs from threshold comparators 36~39. When one of the unit cells C1~C4 is overcharged, the overcharged cell detector 37 supplies a module overcharged signal Smc through a photocoupler, not shown, to the battery pack controller 4. Likewise, when one of the unit cells C1~C4 is overdischarged, the overdischarged cell detector 38 supplies a module overdischarged signal Smd through a photocoupler to the battery pack controller 4.

Module Voltage Detection by Battery Pack Controller

Figure 4:
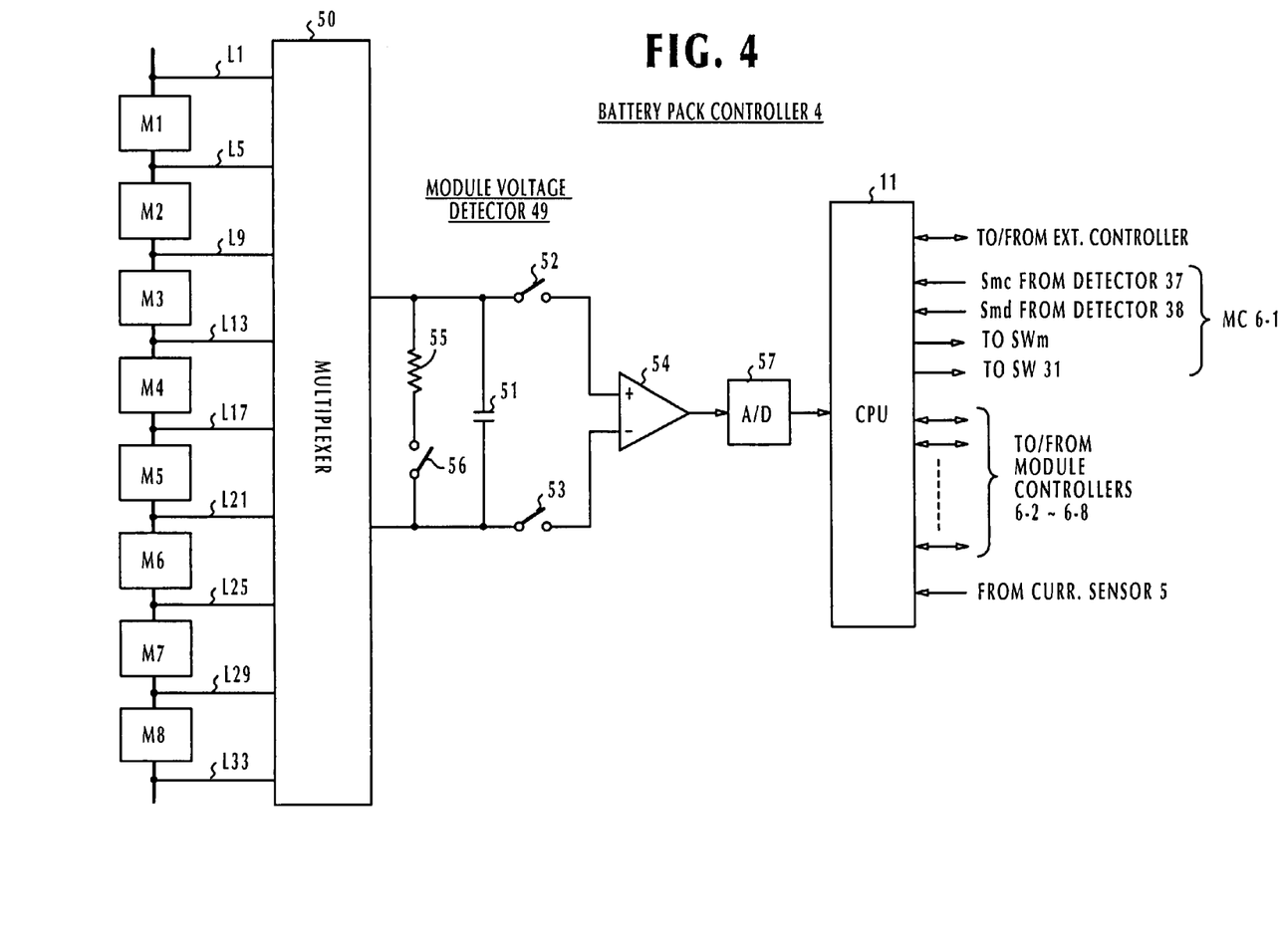
FIG. 4 is a circuit diagram of the anomaly detector of FIG. 3.

As shown in FIG. 4, the battery pack controller 4 includes a module voltage detector 49 that takes its input voltage through a multiplexer 50 selectively in sequence from the modules M1~M8. Voltage detector 49 performs a pumping action on the voltage supplied from the multiplexer 50 by charging it into a flying capacitor 51 and then closing normally-open switches 52 and 53 to impress the capacitor voltage to a differential amplifier 54, while at the same time the internal switch of the multiplexer 50 is turned off. Differential amplifier 54 thus produces an output voltage representing the voltage of a module selected by the multiplexer 50. The output of differential amplifier 54 is converted to a digital signal in an analog-digital converter 57 and supplied to the CPU 11. CPU 11 compares the voltage of each module selected by the multiplexer 50 with the voltages of other modules and determines whether or not the selected module is overcharged or all module voltages of the battery pack 1 differ significantly from each other.

Before the next module is selected by the multiplexer 50, a reset circuit is operated, which is formed with a resistor 55 and a normally-open switch 56. By closing the switch 56, the flying capacitor 51 is discharged through the resistor 55.

Discharge Inhibition in Response to Outputs of OVC/OVD Detector

CPU 11 of the battery pack controller 4 responds to each of these output signals Smc and Smd from the overcharge/overdischarge detector 9 by sending a discharge input signal to the photocoupler switch 31 to prevent all discharge circuits 26~29 from being discharged. The effect of this inhibit operation is to hold the cell voltages at the values which were detected by the overcharge/overdischarge detector 9.

Preferably, the CPU 11 performs reading of the signals Smc and Smd from the detector 9 at periodic intervals and operates the discharge inhibiter 30 by sending an inhibit signal to its switch 31 for an interval that runs from the instant somewhat earlier than the start timing of the reading operation to its end timing.

Figure 5:
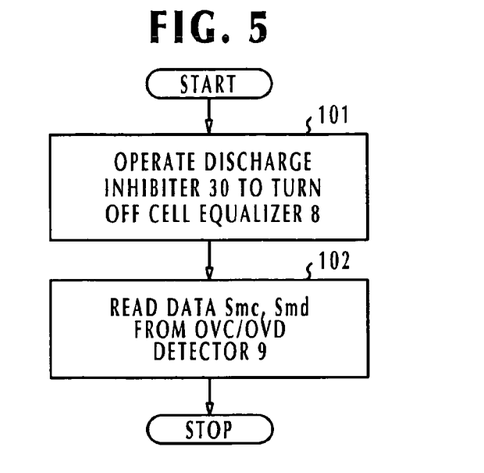
FIG. 5 is a flowchart of the operation of the battery pack controller inhibits the cell equalizer when it reads output data of an overcharge/overdischarge detector.

Alternatively, as shown in the flowchart of FIG. 5, the CPU 11 operates the discharge inhibiter 30 (step 101) before it reads the output signals Smc and Smd of detector 9 (step 102).

Since all unit cells C1~C4 are not simultaneously discharged, some of the unit cells were being discharged while others were not at the instant the detector 9 produced an output signal. Therefore, the voltage drops of the cells being discharged are different from those of the other cells due to different values of their internal impedance. As a result, undesirable variations can occur in the cell voltages and the reliability of the operation of overcharge/overdischarge detector 9 would be lost.

Module Voltage Equalization

Module voltage equalization of each module is performed by the discharge circuit 10 provided for this module in the battery pack controller 4. If the CPU 11 determines that the module 1 is overcharged or all module voltages of the battery pack 1 differ significantly from each other, it turns on the switch SWm of discharge circuit 10. As a result, the module M1 is discharged until it equals the voltages of the other modules. Since a discharge circuit 10 is provided for each module, all module voltages are equalized.

Inhibition of Equalization Circuits During Module Voltage Detection

When the module voltage detector 49 is operating to successively detect module voltages from the battery pack 1, the battery pack controller 4 preferably sends a control signal from its CPU 11 to the cell discharge inhibiter 30 of cell equalizer 8 and/or the switch SWm to prevent all unit cells from being discharged by the discharge circuits 26~29 as well as by the module discharge circuit 10. This eliminates possible voltage variations that can occur between lines L1 and L5 and ensures reliability of operation for the module voltage detector 49.

Detection of Line-Cut on Module-Connecting Lines and Battery-Pack-Connecting Lines The following is a description of a method of detecting a line-cut which can occur on the module connecting lines L1, L5, L9, L13, L17, L21, L25, L29 and L33. It is known that most line-cut events occur on a single module connecting line. This method is performed by the CPU 11 according to the flowchart shown in FIG. 6. Initially, the CPU 11 operates the discharge inhibiter 30 of all modules to inhibit the operation of their cell equalizer 8 and makes a search for a line-cut by monitoring the module connecting lines (step 201).

If a line-cut occurs on one of the module connecting lines L5, L9, L13, L17, L21, L25, L29, the module voltage detector 49 of the battery pack controller 4 receives a zero voltage when two adjacent modules are successively selected by the multiplexer 50 and no voltage is charged into the flying capacitor 51. CPU 11 receives zero-voltage values from the differential amplifier 54 at two successive instants of module selection. If a line-cut occurs on the line L5, the CPU 11 reads two zero-voltage values in succession from the modules M1 and M2 when they are selected by the multiplexer 50.

Figure 6:
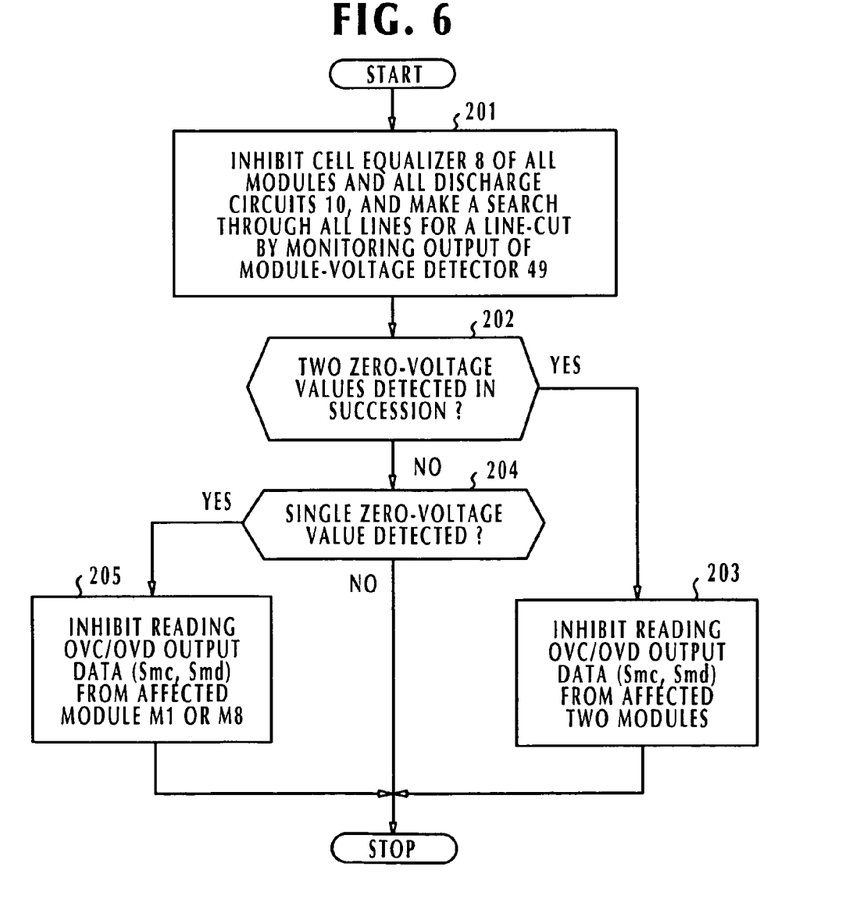
FIG. 6 is a flowchart of the operation of the battery pack controller when it performs a line-cut detection routine.

Therefore, if the CPU detects two zero-voltage values in succession from the output of module-voltage detector 49, it is determined that a line-cut has occurred on one of the module connecting lines (step 202). If the decision is affirmative at step 202, flow proceeds to step 203 to inhibit the reading of Smc and Smd output data from the affected two modules.

If no zero-voltage values are detected in succession, the decision is negative at step 202, and flow proceeds to step 204 to check to see if a zero voltage detected on one of the connecting lines L1 and L33.

If the CPU 11 detects a zero voltage value when the module M1 is selected by the multiplexer 50, the CPU 11 recognizes that a line-cut has occurred on the line L1. Similarly, if the CPU 11 detects a zero voltage value when the module M8 is selected, the CPU 11 recognizes that a line-cut has occurred on the line L33.

Therefore, if a single zero-voltage value is detected at step 204, which is not followed by another zero-voltage value, it is determined that a line-cut has occurred on one of the lines L1 and L33, and flow proceeds to step 205 to inhibit the reading of Smc and Smd output data from one of the affected modules M1 and M8. If the decision is negative at step 204 or steps 203 and 25 are executed, the CPU 11 proceeds to the end of the routine.

Since the line-cut detection routine is performed with the cell equalizer 8 of all modules being disabled initially at step 201, zero-voltage values can be precisely detected due to the absence of interference from the turn-on of discharge circuits 26~29.

Figure 7:
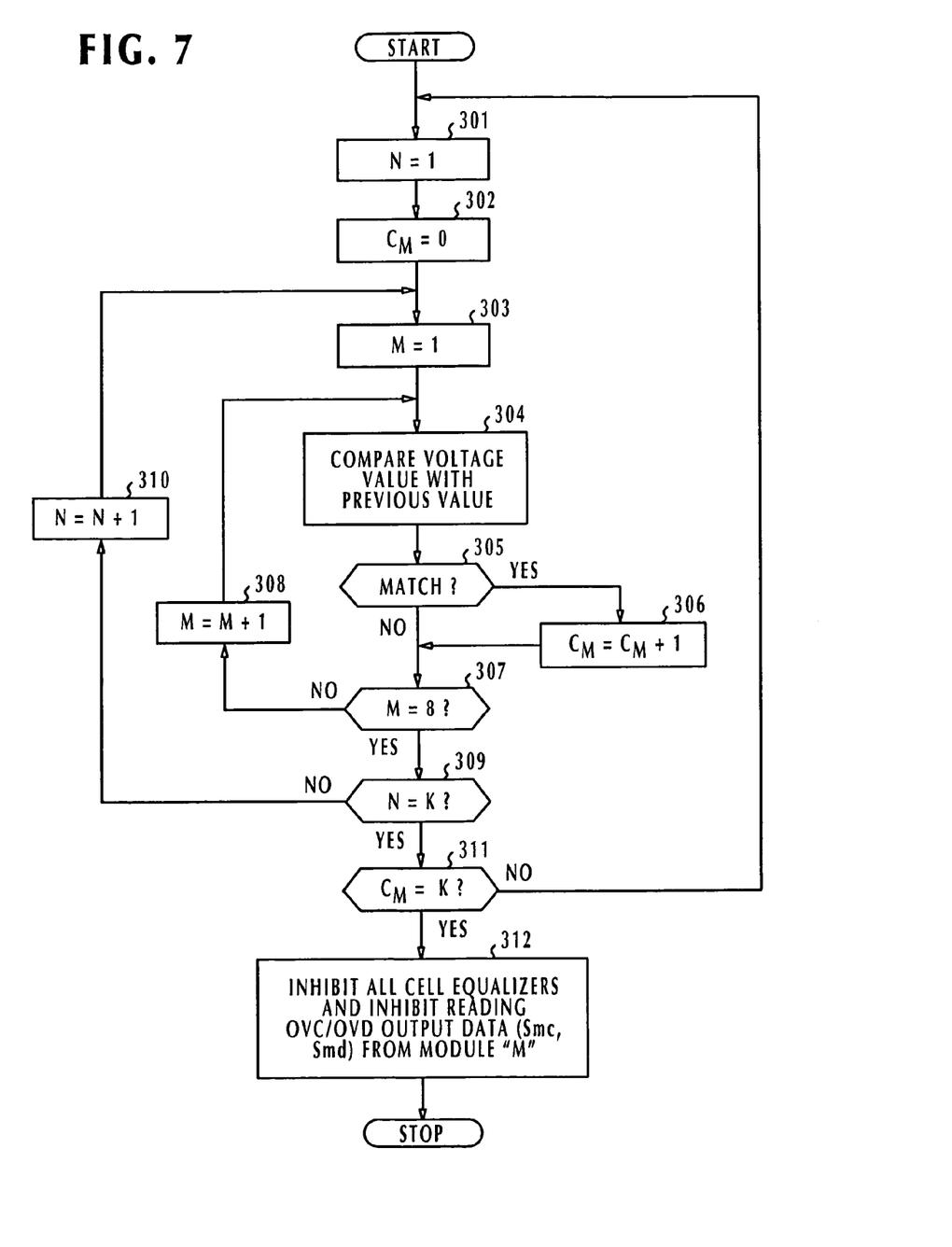
FIG. 7 is a flowchart of the operation of the battery pack controller when it performs a modified line-cut detection routine using successively detected module voltages.

A modified embodiment of the line-cut detection routine is shown in FIG. 7. CPU 11 starts with step 301 by setting a count value N to 1. Count value N represents the number of times the CPU 11 repeatedly performs the line-cut detection routine. At step 302, a count value $C_M$ is initialized to zero. This variable indicates the number of matches that occur on a given battery-pack module "M" between its previous voltage value and its most recent voltage value.

At step 303, a variable M representing each battery-pack module is set to 1. At step 304, the CPU 11 compares the current voltage value supplied from the module voltage detector 49 with its previous voltage value, and determines if they match or mismatch (step 305). If they match, flow proceeds from step 305 to step 306 to increment the count value $C_M$ by 1 and moves to decision step 307. If they mismatch at step 305, step 306 is skipped and flow proceeds to step 307. If the variable M is smaller than the maximum number (=8) of modules provided in the battery pack 1 (step 307), the CPU 11 proceeds to step 308 to increment the variable M by 1 and returns to step 304 to repeat the process on the next module. If M=8, flow proceeds from step 307 to step 309 to check to see if the count value N is equal to a predetermined value K. If not, flow proceeds from step 309 to step 310 to increment the count value N by 1 and returns to step 303.

In this way, match counting step 306 is repeated K times when the count value N equals K at step 309. At decision step 311, the CPU 11 determines whether or not the match count value $C_M$ of module "M" is equal to a predetermined number (=K). If a line-cut has occurred on a line connecting a module "M" to the battery-pack controller 4, the previous and current voltages of this module will continuously match during the K-time period and the count value $C_M$ will be equal to K at step 311. When this occurs, the CPU 11 proceeds from step 311 to step 312 to inhibit all cell equalizers 8 and inhibit the reading of output data (Smc, Smd) from the module "M". If the line-cut has occurred on one of the module connecting lines L5, L9, L13, L17, L21, L25, L29, there are two adjacent modules "M(i)" and "M(i+1)", of which the count values $C_{M(i)}$ and $C_{M(i+1)}$ are equal to K. If the line-cut has occurred on one of the battery-pack connecting lines L1 and L33, there is only one module "M" whose count value $C_M$ equals K.

Detection of Line-Cut on Module-Connecting Lines

Figure 8:
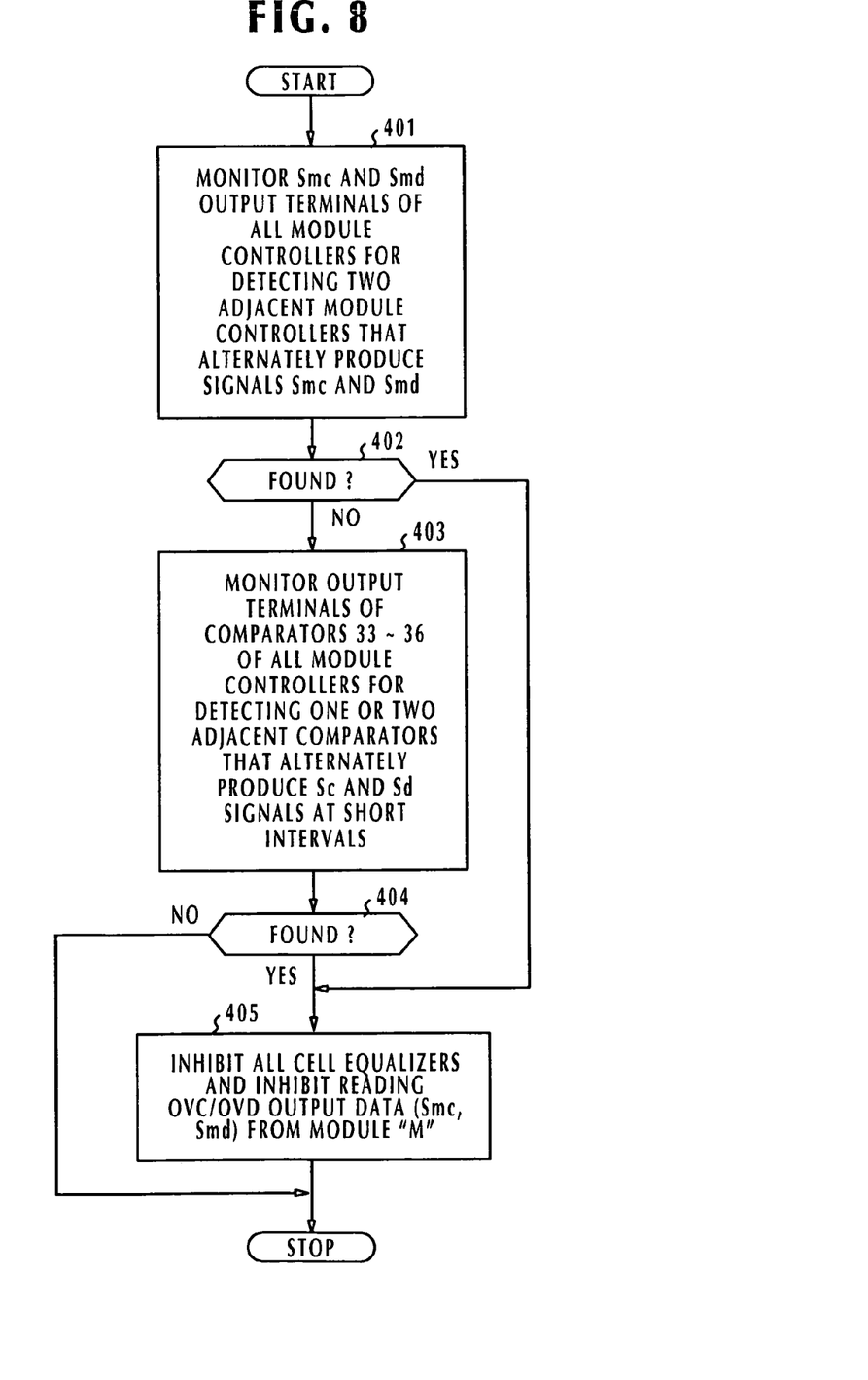
FIG. 8 is a flowchart of the operation of the battery pack controller when it performs a modified line-cut detection routine using successively detected module voltages.

The following is a description of another method of detecting a line-cut on the module-connecting lines L5, L9, L13, L17, L21, L25 and L29 as well as a line-cut on the cell-connecting lines that connect the individual unit cells of each module to the associated module controller with reference to the flowchart of FIG. 8. In this embodiment, the CPU 11 begins a line-cut detecting routine with step 401 to monitor the overcharge (Smc) and overdischarge (Smd) output terminals of all module controllers for detecting any two adjacent module controllers that alternately produce overcharge signal Smc and overdischarge signal Smd.

Figure 9:
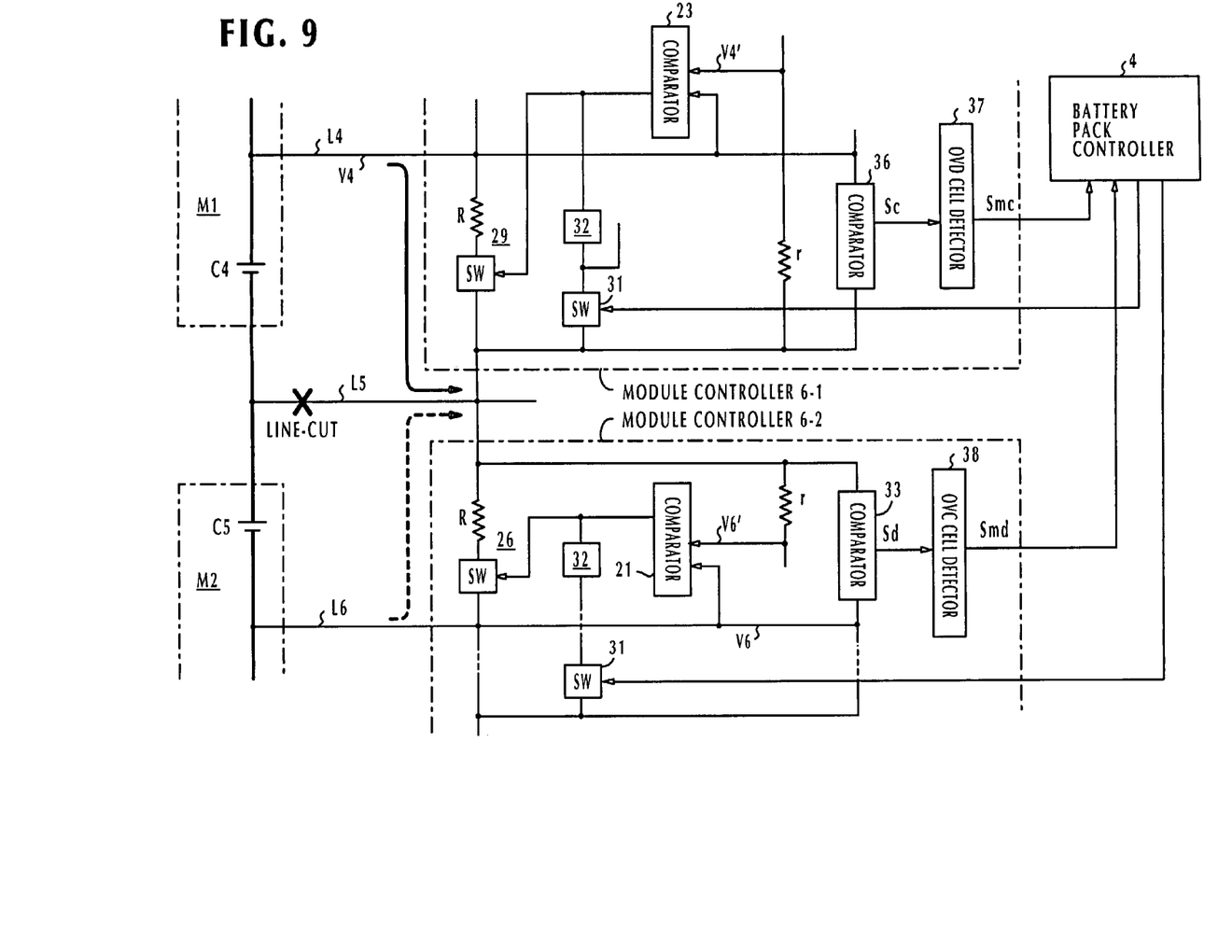
FIG. 9 is a block diagram showing portions of adjacent module controllers for describing the operation of the battery pack controller when it performs a line-cut detection subroutine on the cell-connecting lines.

Assume that a line-cut occurs on the module-connecting line L5 as indicated by a symbol X in FIG. 9, and the discharge circuit 29 of module controller 6-1 is turned on in response to an output from the comparator 23, the line L4 is coupled through the low-impedance discharge circuit 29 to the line L5 as indicated by the thick solid line. Therefore, the cell-connecting line L5 is brought to a level virtually equal to the line voltage V4. This drives the line voltage V4 to a level lower then the reference voltage V4' and drives the line voltage V6 of the cell-connecting line L6 to a level lower than the reference voltage V6'. As a result, the comparator 23 of module controller 6-1 turns off its discharge circuit 29 and the comparator 21 of module controller 6-2 turns on its discharge circuit 26, thus coupling the cell-connecting line L6 through the low-impedance discharge circuit 26 to the module-connecting line L5, instead of the line voltage V4.

As a result, the module-connecting line L5 is now brought to a level virtually equal to the line voltage V6. Hence the comparator 21 of module controller 6-2 turns off its discharge circuit 26, while the comparator 23 of module controller 6-1 turns on its discharge circuit 29, coupling the voltage V4 to the module-connecting line L5 again.

Thus, the line-cut on the module-connecting line L5 causes its line voltage to fluctuate in a range twice the cell voltage, and the comparator 36 of module controller 6-1 produces an overcharge signal Sc and the comparator 33 of module controller 6-2 produces an overdischarge signal Sd, alternately with the comparator 36. Therefore, adjacent module controllers 6-1 and 6-2 alternately produce overcharge signal Smc and overdischarge signal Smd.

Returning to FIG. 9, if the CPU 11 determines that two adjacent module controllers are alternately producing overcharge and overdischarge signals Smc and Smd (step 401), the CPU recognizes that a line-cut has occurred on one of the module-connecting lines. In this instance, the decision at step 402 is affirmative and flow proceeds to step 405 to inhibit all cell equalizers 8 and inhibit the reading of output data (Smc, Smd) from the module "M".

Detection of Line-Cut on Cell-Connecting Lines

If no line-cut is detected on the module-connecting lines, the decision at step 402 is negative and flow proceeds to step 403 to detect a line-cut on the cell-connecting lines of all module controllers, i.e., L2~L4, L6~L8, . . . , L30~L32.

Figure 10:
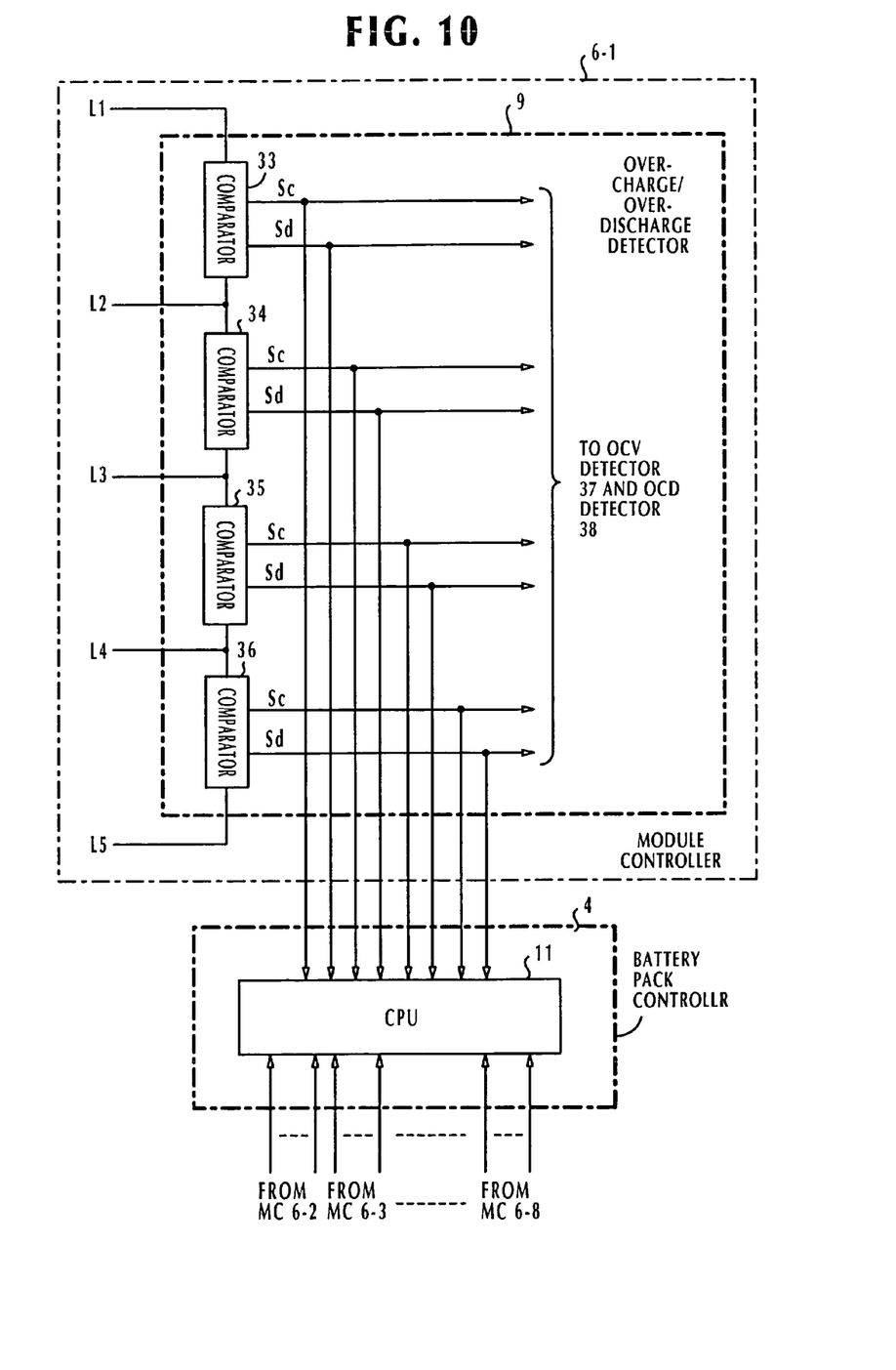
FIG. 10 is a block diagram of an overcharge/overdischarge detector connected to the battery pack controller to perform a line-cut detection on the cell-connecting lines according to a modified embodiment of the present invention.

To perform this line-cut detection process at step 403, the output terminals of all comparators 33 to 36 of each module controller are connected to the CPU 11 as shown in FIG. 10. CPU 11 monitors the output terminals of comparators 33 to 36 of all module controllers for detecting one or two adjacent comparators alternately producing overcharge signal Sc and overdischarge signal Sd.

If a line-cut occurs on the cell-connecting line L2 and the discharge circuit 26 is turned on in response to an output from the comparator 23 (FIG. 2), the line L2 is coupled through the low-impedance discharge circuit 26 to the cell-connecting line L1. Therefore, the line L2 is driven to a level virtually equal to the line voltage V1. This raises the line voltage V2 to a level higher than the reference voltage V2', and lowers the line voltage V3 to a level below the reference voltage V3'. As a result, the comparator 33 recognizes that the unit cell C1 is overdischarged, producing an overdischarge signal Sd, while the comparator 34 recognizes that the unit cell C2 is overcharged, producing an overcharge signal Sc.

At the same time, the comparator 21 turns off the discharge circuit 26 and the comparator 24 turns on the discharge circuit 27, coupling the cell-connecting line L2 to the line L3 via the low-impedance discharge circuit 27 so that the line L2 is driven to a level virtually equal to the line voltage V3. This lowers the line voltage V2 to a level below the reference voltage V2', and raises the line voltage V3 to a level above the reference voltage V3'. As a result, the comparator 33 recognizes that the unit cell C1 is overcharged, producing an overcharge signal Sc, while the comparator 34 recognizes that the unit cell C2 is overdischarged, producing an overdischarge signal Sd.

At the same time, the comparator 21 turns on the discharge circuit 26, and the comparator 24 turns off the discharge circuit 27. Thus, the line L2 is driven to a level virtually equal to the line voltage V1. Therefore, the line L2 is returned to the initial state of voltage V1 that appeared on it immediately following the occurrence of its cut-off. It is seen that the discharge circuits 26 and 27 are alternately turned on and off at short intervals.

Returning to step 403 of FIG. 8, the CPU 11 monitors the outputs of comparators 33 to 36 of all module controller and checks to see if there is at least one comparator that alternately produces overcharge and overdischarge signals at short intervals. If such comparators are detected (step 404), flow proceeds to step 405 to perform the inhibition as described above. If no line-cut is detected at step 404, flow proceeds to the end of the routine.

Figure 11:
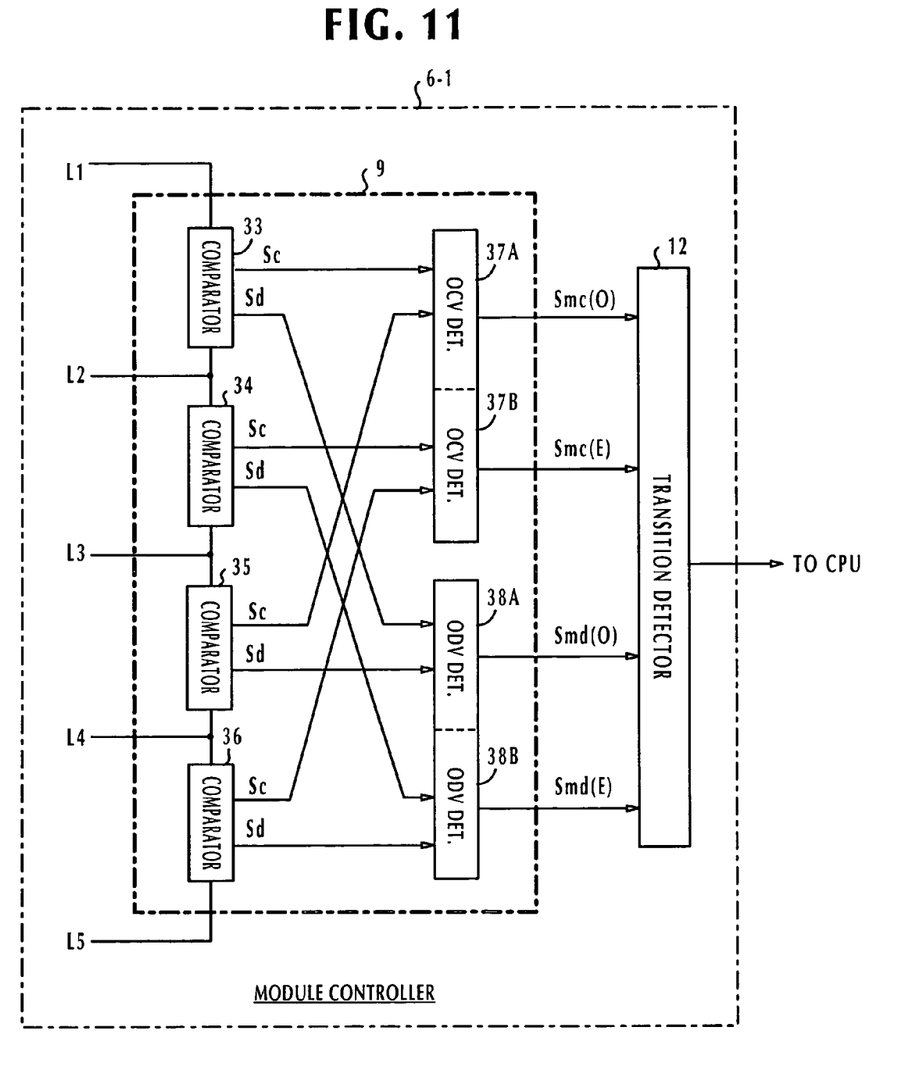
FIG. 11 is a block diagram of the overcharge/overdischarge detector according to a further modification of the present invention for detecting a line-cut on the cell-connecting lines.

Alternatively, the overcharge/overdischarge detector 9 is modified as shown in FIG. 11 to provide line-cut detection on the cell-connecting lines L2, L3 and L4 of the module controller 6-1. In this modification, the overcharge detector 37 is divided into an odd-numbered overcharge cell detector 37A and an even-numbered overcharge cell detector 37B, and the overdischarge detector 38 is likewise divided into an odd-numbered overdischarge cell detector 38A and an even-numbered overdischarge cell detector 38B.

Odd-numbered overcharge cell detector 37A receives overcharge signals Sc from the comparators 33 and 35 to produce an overcharge signal Smc(O) and the even-numbered overcharge cell detector 37B receives overcharge signals Sc from the comparators 34 and 36 to produce an overcharge signal Smc(E). Odd-numbered overdischarge cell detector 38A receives overdischarge signals Sd from the comparators 33 and 35 to produce an overdischarge signal Smd (O) and the even-numbered overdischarge cell detector 38B receives overdischarge signals Sd from the comparators 34 and 36 to produce an overdischarge signal Smd(E).

The outputs of all detectors 37A, 37B, 38A and 38B are coupled to a transition detector 12 that analyzes the transition states of all input signals. If a line-cut occurs on one of the cell-connecting lines L2, L3 and L4, the transition detector 12 locates the failed cell-connecting lines and informs the CPU 11 of the identity of the disconnected line.

Time-Shared Operation when Ignition Switch is Off

Figure 12A:
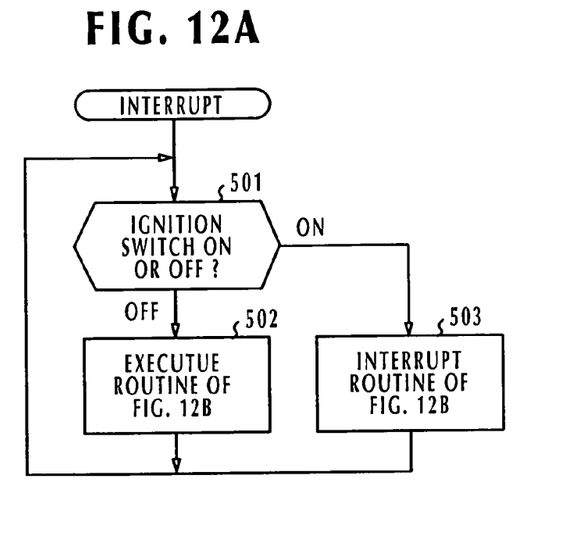
FIGS. 12A and 12B are flowcharts of a time-shared modes of operation when the main switch of the battery pack is turned off.
Figure 12B:
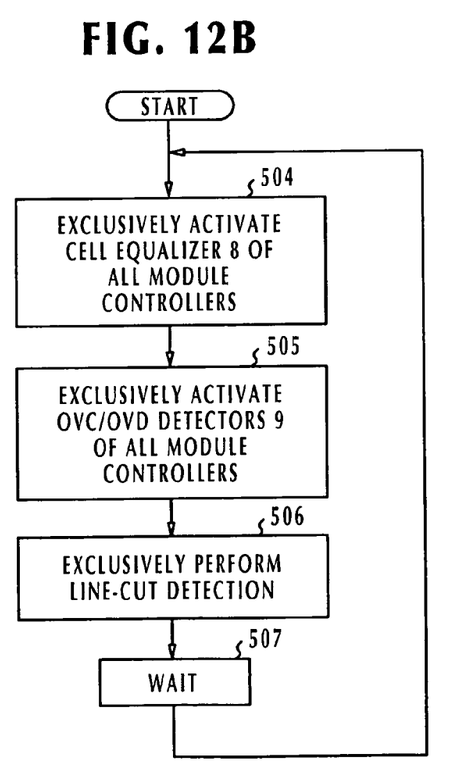

Another method of time-shared modes of overcharge/overdischarge detection, line-cut detection and cell/module equalization is shown in FIGS. 12A and 12B.

If a main switch of the battery pack such as the automobile ignition switch is turned off (step 501), the CPU 11 executes the routine of FIG. 12B (step 502). CPU 11 monitors the main switch (step 501) and if it is turned on, the CPU interrupts the routine of FIG. 12B (step 503).

CPU 11 executes the routine of FIG. 12B by exclusively activating the cell equalizer 8 of all module controllers so that the overcharge/overdischarge detector 9 of all module controllers and the line-cut detection are inhibited (step 504). Following step 504, the CPU 11 exclusively activates all the overcharge/overdischarge detectors 9 so that all cell equalizers 8 and line-cut detection are inhibited (step 505). Subsequently, the CPU 11 exclusively performs line-cut detection (step 506) so that all cell equalizers and all overcharge/overdischarge detectors are inhibited. At step 508, the CPU 11 waits a predetermined interval of time before returning to step 504. Whenever the ignition switch is operated (step 503), the CPU 11 interrupts the execution of the routine of FIG. 12B.

If the main switch is in a turn-off state for an extended period of time, it is likely that voltage variability develops between the unit cells due to their spontaneous discharge. The activation of the cell equalizers 8 during the turn-on state of the ignition switch can eliminate the variability problem. A further advantage is that, when the cell equalizers are operated the battery pack 1 is in a fully unloaded state, and hence the cell equalizers can utilize the open-circuit voltages of all unit cells to equalize their voltages.

What is claimed is:

1. A battery pack manager for a plurality of rechargeable unit cells connected in series, wherein said unit cells are divided into a plurality of battery-pack modules, comprising a battery-pack controller, connected to said battery-pack modules via a pair of battery-pack connecting lines and a plurality of module-connecting lines, that successively detects a voltage value of each of said battery-pack modules, determines that a line-cut has occurred on one of said battery-pack connecting lines if a single zero-voltage value is detected and determines that a line-cut has occurred on one of said module-connecting lines if two zero-voltage values are detected in succession.

2. The battery pack manager of claim 1, further comprising a plurality of module controllers connected to said battery-pack modules respectively via said pair of battery-pack connecting lines and said plurality of module-connecting lines, wherein each of said module controllers comprises an overcharged, overdischarge detector, connected to said unit cells of the associated battery-pack module via said module-connecting lines and a plurality of cell-connecting lines, that makes a decision on whether said unit cells of each battery-pack module are overcharged or overdischarged, wherein said battery-pack controller inhibits reading of an output signal from the overcharge/overdischarge detectors of a pair of adjacent module controllers when said battery-pack controller determines that a line-cut has occurred on one of said module-connecting lines, and inhibits reading of an output signal from the overcharge/overdischarge detector of one of said module controllers when said battery-pack controller determines that a line-cut has occurred on one of said battery-pack connecting lines.

3. The battery pack manager of claim 1, wherein each of said module controllers comprises a cell equalizer connected to the unit cells of the associated battery-pack module via said plurality of cell-connecting lines for individually causing the unit cells to discharge when voltages developed by the unit cells differ from reference voltages, wherein said battery-pack controller inhibits said cell equalizer of all of said module controllers when said battery-pack controller is making a determination that a line-cut has occurred on any of said connecting lines.

4. The battery pack manager of claim 1, wherein said battery-pack controller makes a comparison between a most recent voltage value and a previous voltage value of each battery-pack module to detect a match or a mismatch, repeats said comparison on each of said battery-pack modules, and determines that a line-cut has occurred on one of said connecting lines if said match is repeatedly detected.

5. The battery pack manager of claim 4, wherein said battery-pack controller monitors output signals of said overcharge/overdischarge detector of each of said module controllers, and determines that a line-cut has occurred on one of said module-connecting lines if a pair of adjacent module controllers alternately produce overcharge and overdischarge signals.

6. The battery pack manager of claim 5, wherein each of said module controllers further comprises a plurality of overcharge/overdischarge comparators respectively connected to the unit cells of the associated battery-pack module via said cell-connecting lines for generating output signals indicating whether the unit cells of the associated battery-pack module are overcharged or overdischarged, wherein said battery-pack controller monitors output signals of said overcharge/overdischarge comparators of each of said module controllers, and determines that a line-cut has occurred on one of said cell-connecting lines if a pair of adjacent overcharge/overdischarge comparators alternately produce overcharge and overdischarge signals.

7. The battery pack manager of claim 6, wherein each of said module controllers further comprises logic circuitry, connected to said overcharge/overdischarge comparators of the module controller, that divides overcharge output signals from said comparators into a first odd-numbered group and a first even-numbered group, divides overdischarge output signals from said comparators into a second odd-numbered group and a second even-numbered group, analyzes transition states of output signals that occur in sequence from said first odd-numbered group, said first even-numbered group, second odd-numbered group and said second even-numbered group, and determines that said line-cut has occurred on one of said cell-connecting lines depending on the analyzed transition states.

8. A method of detecting a line-cut on a plurality of connecting lines connecting a plurality of series-connected rechargeable unit cells to control circuitry, wherein said unit cells are divided into a plurality of battery-pack modules, comprising the steps of:

a) successively detecting a voltage value of each of said battery-pack modules; and b) determining that a line-cut has occurred on one of said battery-pack connecting lines if a single zero-voltage value is detected or that a line-cut has occurred on one of said module-connecting lines if two zero-voltage values are detected in succession.

9. The method of claim 8, wherein said control circuitry includes a plurality of module controllers connected to said battery-pack modules respectively via said pair of battery-pack connecting lines and said plurality of module-connecting lines, d) performing a decision on whether said unit cells of each battery-pack module are overcharged or overdischarged, e) inhibiting reading of a result of the decision by step (d) performed on a pair of adjacent module controllers if step (b) determines that a line-cut has occurred on one of said module-connecting lines; and f) inhibiting reading of a result of the decision by step (d) performed on one of said module controllers if step (b) determines that a line-cut has occurred on one of said battery-pack connecting lines.

10. The method of claim 9, wherein each of said module controllers comprises a cell equalizer connected to the unit cells of the associated battery-pack module via said plurality of cell-connecting lines for individually causing the unit cells to discharge when voltages developed by the unit cells differ from reference voltages, further comprising the step of inhibiting said cell equalizer of all of said module controllers when step (b) is being performed.

11. The method of claim 9, wherein step (b) comprises the steps of:

making a comparison between a most recent voltage value and a previous voltage value of each battery-pack module to detect a match or a mismatch;

repeating said comparison on each of said battery-pack modules; and determining that a line-cut has occurred on one of said connecting lines if said match is repeatedly detected.

12. The method of claim 9, wherein step (b) comprises the step of determining that a line-cut has occurred on one of said module-connecting lines if the decision of step (d) performed on a pair of adjacent module controllers alternately indicates overcharge and overdischarge of one of said unit cells.

13. The method of claim 9, wherein each of said module controllers further comprises a plurality of overcharge/overdischarge comparators respectively connected to the unit cells of the associated battery-pack module via said cell-connecting lines for generating output signals indicating whether the unit cells of the associated battery-pack module are overcharged or overdischarged, wherein step (a) comprises monitoring output signals of said overcharge/overdischarge comparators of each of said module controllers, and step (b) comprises determining that a line-cut has occurred on one of said cell-connecting lines if a pair of adjacent overcharge/overdischarge comparators alternately produce overcharge and overdischarge signals.

* * * * *